July 26, 1966 R. L. WHITELAW 3,262,820
CONTROL MEANS FOR A HEAT SOURCE
Filed April 18, 1963
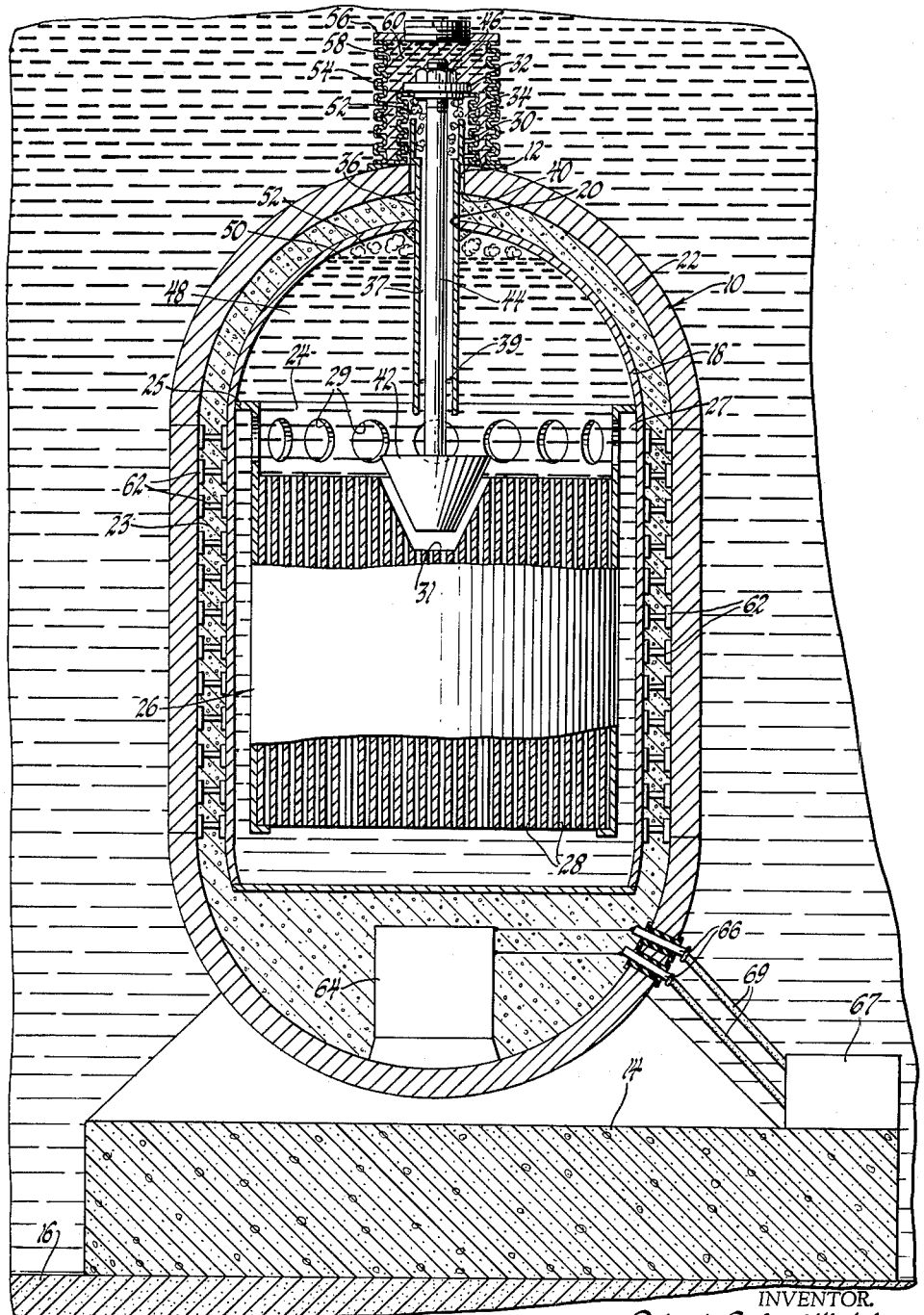
INVENTOR.
Robert Leslie Whitelaw
BY
C. W. Christen
ATTORNEY

United States Patent Office 3,262,820
Patented July 26, 1966

3,262,820
CONTROL MEANS FOR A HEAT SOURCE
Robert Leslie Whitelaw, Indianapolis, Ind., assignor to General Motors Corporation, Detroit, Mich., a corporation of Delaware
Filed Apr. 18, 1963, Ser. No. 274,030
8 Claims. (Cl. 136—202)

This invention relates to control means and more particularly to means for controlling the temperature of a heat source.

In general, a nuclear reactor power plant includes a reactor core of nuclear material and a neutron leakage control member movable with respect to the core to control leakage of neutrons from the core and hence the temperature of the reactor. One form of the prior art for controlling the position of the control member with respect to the reactor core includes the use of telemetry methods whereby the neutron density of the reactor is sensed and relayed to a suitable indicating device at a remote location for observation by personnel. Suitable control means including a mechanical connection with the control member may be operated to control the location of the control member with respect to the reactor core. This method is used during the lifetime of the reactor whenever it is desired to adjust the plant's output power level. However, the described method is not deemed practical where it is desired to locate the plant at a remote location such as on an ocean floor and leave it undisturbed from remote control throughout the reactor's lifetime.

In accordance with this invention, means are provided for controlling the temperature of an unattended heat source such as a nuclear reactor without the necessity of remote control. This is accomplished by mounting the heat source in a closed container which is to be submerged in a fluid of relatively constant pressure such as that existing in the area of an ocean floor. The container includes a flexible portion to which control means are mounted within the container for movement with respect to the heat source to control the temperature of the source. Accordingly, by filling the container with fluid prior to its being submerged, the control means will, when the container is submerged, be automatically correctly positioned with respect to the heat source due to the constant pressure exerted on the container by the fluid exteriorly thereof as the temperature of the source tends to vary.

A more complete understanding of this invention may be had from the detailed description which follows taken with the accompanying drawing in which the single figure is a diagrammatic view illustrating one embodiment of the invention. The figure shows a nuclear reactor thermoelectric plant comprising a mechanically rigid container 10 constructed of stainless steel to resist corrosion and having an opening 12 defined in one end and a closed end mounted to a concrete platform 14 secured to an ocean floor 16 so that the container is completely submerged in ocean water with its open end directed substantially vertically upward. A second mechanically rigid container 18 having an opening 20 defined therein is located within the container 10 defining a space 22 therebetween with the opening 20 located adjacent to and in alignment with the opening 12 in the container 10. A sleeve 24 having a flanged end 25 and a plurality of openings 29 formed therein near the flanged end is located within the container 18 with its flanged end mounted on the inner surface of the container so as to define an annular downflow passage 27 between the container 18 and the sleeve. The sleeve 24 has mounted therein a reactor core 26 of nuclear fuel material with a conical recess 31 formed in the top surface thereof. Preferably, the core 26 consists of a uniform dispersion of beryllium oxide (BeO) or some other refractory material such as molybdenum (Mo) or columbium (Cb) and uranium oxide ($UO_2$), not necessarily in equal quantities, and has defined therein a plurality of coolant passages 28 which extend longitudinally through the core.

The container 18 is partially filled with a reactor coolant 48 to a level 50. Preferably, the reactor coolant 48 takes the form of a mixture of sodium and potassium rather than sodium which is also frequently used as a reactor coolant. The coolant 48 could be mercury, if desired. The preference is due to the desirability of using reactor coolant in a liquid state to cool the reactor core if start up is desired as the plant is lowered into ocean water exhibiting a temperature of approximately 60° F. The preferred sodium potassium mixture is in a liquid state at approximately 12° F. whereas sodium freezes at approximately 208° F. It is apparent that if sodium is used as a coolant, pre-heating of the coolant would be required for it to be in a liquid state prior to lowering the plant into the ocean water.

A plurality of thermoelectric elements 62 are mounted between the containers 10 and 18 for purposes of generating electrical energy due to a temperature difference existing between the containers. The temperature difference exists because the desired mean operating temperature of the reactor is 750° F. and, as mentioned hereinbefore, the temperature of the surrounding ocean water is approximately 60° F. In order to maintain a high temperature difference between the containers, the space 22 is filled with a bonded porous insulating material 23 which is characterized by being of extremely low thermal conductivity somewhat below that of still air. In addition, the insulating material 23 has sufficient compressive strength to support the container 18 within the container 10. Suitable electrical means (not shown) connects the hot and cold junctions of the thermoelectric elements 62 with a D.C. to D.C. inverter 64 mounted on the inner surface of the container 10. The inverter 64 serves to amplify output voltages generated by the thermoelectric elements and provides an output voltage across a pair of insulated output terminals 66 connected therewith and protruding through the container 10. The terminals 66 may be connected with a circuit utilization device 67 via a pair of insulated leads 69.

During operation of the nuclear thermoelectric plant, the heat generated by the reactor will be at a mean temperature of 750° F. with the desired temperature in the lower portion of the core being 740° F. and that in the upper portion of the core being 760° F. Thus as the coolant 48 circulates in the container 18 it flows upward through the passages 28 in the core 26, absorbing heat, expanding and becoming less dense. As the coolant 48 turns through the openings 29 in the sleeve member 24, it flows downwardly through the downflow passage 27 where it gives up heat to the surrounding ocean water via the thermoelectric elements 62 as it cools from 760° F. to 740° F. Since the ocean water surrounding the container 10 is isothermal at a temperature of approximately 60° F. to 40° F. and as it provides a natural heat sink for the thermoelectric elements, a relatively constant temperature differential is maintained between the hot and cold junctions of the elements so that the output voltage appearing across the terminals 66 remains relatively constant.

The dimensions of the reactor structure including the thermoelectric elements 62 are given in the following tables:

Reactor structure

Thermoelectric elements 62:
- Number of elements _____ 600.
- Number of parallel circuits __ 8.
- Effective temperature difference _____ 630° F.
- Voltage per circuit _____ 5.0 volts.
- Junction constituents:
  - n _____ PbTe.
  - p _____ $.10AgSbTe_2-.9GeTe$.
- Length per element _____ 0.32 in.
- Efficiency per element _____ 4.6%.

Reactor core 26, right cylinder:
- Diameter _____ 24 in.
- Material _____ $UO_2$ dispersion in BeO.
- Inventory _____ 5 kg. $U^{235}$.
- Loading _____ 6 kg. $UO_2$.
- Lifetime _____ 20 years.
- Lifetime total integrated dose maximum _____ $1 \times 10^{18}$ $n/cm.^2$
- Irradiation _____ 8000 mwd./t.

Coolant passages 28:
- Number _____ 1000.
- Diameter _____ 0.25 in.

Coolant 48 _____ NaK.
- Coolant mean temperature __ 750° F.
- Coolant rise temperature ____ 20° F.

Maximum core temperature (approximately) _____ 800° F.

Overall size of plant:
- Diameter _____ 28 in.
- Height _____ 66 in.

Weight of plant _____ 2300 lb.

Power data

- Thermoelectric output _____ 100 watts.
- Reactor output _____ 5000 watts.
- Overall efficiency _____ 2%.

Since the overall efficiency of the reactor is 2% and almost all of its losses are by conduction, the reactor power will only vary by 2% as load varies from 0 to 100%. The almost constant reactor power lends itself to the relatively simple automatic control means which is the subject of this invention and described in detail hereinafter.

In accordance with this invention, means are provided for controlling the temperature of the reactor and comprises a flexible closure member including a stainless steel bellows 30 hermetically sealed at one end to a bellows cap 32 and at the other end to the container 10 about the periphery of the opening 12 so as to define a chamber 34. An annular guide member 36 is welded at its outer surface to the container 18 about the periphery of the opening 20 so that the guide member extends from within the container 18, through the opening 12 in the container 10 and into the chamber 34 defined by the bellows 30. The guide member 36 is constructed having an outside diameter less than that of the opening 12 in the container 10 so as to define a passage 40 between the chamber 34 and the space 22 between the containers 10 and 18. A conically shaped neutron reflecting control member 42 constructed of the same material as the reactor core 26 or entirely of a neutron moderating and reflecting material such as beryllium oxide (BeO) and of approximately the same size as the conical recess 31 in the core is located within the container 18. The control member 42 is mechanically mounted by means of a bolt 44 and nut 46 on the bellows cap 32 for movement therewith with respect to the reactor core 26 in the space defined by the recess 31 so as to control leakage of neutrons from the core and hence the temperature of the reactor. The bolt 44 is chosen having a diameter less than the inner diameter of the guide member 36 so as to define a space 37 therebetween.

A gas 52 fills the space remaining in the container 18 above the level 50 of the coolant 48, the pores in the insulating material 23 between the containers 10 and 18, the chamber 34 defined by the bellows 30 and the space 37 between the bolt 44 and the guide member 36 above the coolant 48 at a level 39. Preferably, the gas 52 is non-reactive, i.e. it will not react with the sodium potassium coolant 48 and is a non-oxidizing gas selected from the group consisting of argon, nitrogen, helium and krypton.

If the ocean water surrounding the container 10 is mixed with the sodium potassium coolant 48, a violent reaction would result including generation of heat over a very short period. Whereas the bellows 30 is hermetically sealed to the container 10, a back-up safety device is provided in case of a failure of either the bellows 30 or its hermetic seal with the container 10. The safety device takes the form of a second flexible closure member including a stainless steel bellows 54 surrounding the bellows 30 and hermetically sealed at one end to a stainless steel bellows cap 56 and at the other end to the container 10 so as to form a hermetically sealed chamber 58. The chamber 58 is filled with liquid 60 which will not react with the coolant 48 and having the characteristic to flow and remain liquid at high temperatures so as to transmit forces between the bellows caps 56 and 32 to move the control member 42 with respect to the reactor core 26. In view of these requirements, the liquid 60 preferably takes the form of liquid mercury.

The operation of this invention may be more readily understood from the following description of operation. As the nuclear thermoelectric plant is lowered into ocean water to be mounted on the concrete platform 14, the pressure exerted by the ocean water on the container 10 will increase in accordance with the depth of submersion whereby the bellows 54 will be compressed and through the liquid mercury 60 cause the bellows 30 to also be compressed. This will move the control member 42 closer to the reactor core 26 and reflect neutrons emanating therefrom so as to reduce neutron leakage. At a particular depth of submersion, the control member 42 will be sufficiently inserted into the recess 31 in the core 26 so that the reactor becomes critical, i.e. the condition required to maintain a self-supporting chain reaction. Heat will be generated by the reactor causing the coolant 48 to expand and thereby compress the gas 52. If the pressure of the gas 52 in the chamber 34 becomes greater than that exerted by the ocean water on the container 10 (at any particular depth the pressure exerted by the ocean water will remain relatively constant) the bellows 30 and 54 will expand and withdraw the control member 42 from the core 26 to increase neutron leakage and decrease the reactor temperature until the pressure of the coolant 48 and gas 52 is in equilibrium with the ocean water. It is apparent that in assembling the nuclear thermoelectric plant the initial pressure of the gas 52 will be dependent on the depth that the plant is to be submerged.

As burnup of the nuclear fuel occurs during the lifetime of the reactor, the reactor will tend to become subcritical, i.e. the condition existing when a self-supporting chain reaction cannot be maintained, with a resulting decrease in the temperature of the reactor. The coolant 48 will decrease in volume, permitting the gas 52 to expand and hence exert less pressure on the bellows cap 32 and hence also on the bellows cap 56 via the liquid mercury 60. A force due to the pressure differential between the ocean water and the gas 52 will be transferred to the bellows cap 32 via the bellows cap 56 and the liquid mercury 60 to insert the control member 42 further into the core 26. This will continue until neutron leakage from the core 26 has sufficiently decreased so that the temperature of the reactor has increased to a point at which pressure equilibrium exists between the ocean water and the mixture of coolant 48 and gas 52. Thus the temperature of the reactor is maintained constant and hence also the output voltage across the output terminals 66 of the plant.

Although the description of this invention has been given with respective to a particular embodiment, it is not to be construed in a limiting sense. Numerous variations and modifications within the spirit and scope of the invention will now occur to those skilled in the art. For a definition of the invention, reference is made to the appended claims.

I claim:

1. In combination, a heat source submerged in a relatively constant pressure fluid and mounted within a closed rigid container having a flexible outer wall portion, heat source control means mounted within the container on the flexible outer wall portion for movement therewith for controlling the temperature of the source, and the container having fluid therein exerting pressure on the flexible portion in opposition to the pressure of the relatively constant pressure fluid whereby as the temperature of the source varies the internal pressure of the container, forces due to the pressure differential of the fluids exteriorly and interiorly of the container are exerted on the control means via the flexible portion of the container to actuate the control means to thereby control the temperature of the source.

2. In combination, a heat source submerged in a relatively constant pressure fluid and mounted within a rigid container having an opening defined therein, a flexible closure member mounted on the container at the opening to form a part of the outer wall of the container, the container having fluid therein including a portion of liquid and a portion of gas, and heat source means located within the container and mechanically connected with the closure member for movement therewith whereby as the temperature of the source varies the liquid expands and contracts causing the pressure of the gas within the container to vary so that forces due to the pressure differential of the fluids interiorly and exteriorly of the container are exerted on the control means via the closure member to actuate the control means to thereby control the temperature of the source.

3. In combination with a thermoelectric generator including a heat source submerged in a relatively constant pressure fluid, means for controlling the temperature of the source and comprising a first container of rigid construction having an opening defined therein, a second container having an opening defined therein and mounted within the first container so as to define a space therebetween with its opening adjacent to and in alignment with the opening in the first container, the heat source being mounted within the second container, a plurality of thermoelectric elements interposed between the first and second containers for generating electrical energy due to a temperature differential therebetween, a flexible closure member hermetically sealed to the first container at the opening therein to close the opening, the second container being partially filled with liquid, the remaining space in the second container and the space between the first and second containers containing gas with the gas in each space being in communication via the opening in the second container, and heat source control means located within the second container and mechanically connected with the closure member via the opening in the second container whereby as the temperature of the source varies the liquid will expand and contract causing the pressure of the gas within the containers to vary so that forces due to the pressure differential of the fluids interiorly and exteriorly of the containers are exerted on the control means via the closure member to thereby control the temperature of the source.

4. In combination, a nuclear reactor including a core of nuclear fuel material submerged in a relatively constant pressure fluid, means for controlling the temperature of the reactor and comprising a closed container including a flexible portion, the reactor core being mounted within the container, a neutron leakage control member located within the container and mechanically connected with the flexible closure member for movement therewith with respect to the reactor core for controlling the amount of leakage of neutrons from the core, and the container having fluid therein whereby as the temperature of the reactor varies the internal pressure of the container, forces due to the pressure differential of the fluids interiorly and exteriorly of the container are exerted on the control member via the flexible portion of the container to actuate the control member to thereby control neutron leakage and hence the temperature of the reactor.

5. In combination, a nuclear reactor including a core of nuclear fuel material submerged in a relatively constant pressure fluid, means for controlling the temperature of the reactor and comprising a rigid container having an opening defined therein at one end, a flexible closure member hermetically sealed to the container at the opening therein to close the opening, the reactor core having a plurality of coolant passages formed therein and mounted within the container on the inner surface thereof, the container being partially filled with reactor coolant liquid for circulation in the coolant passages to cool the core, a neutron leakage control member located within the container and mechanically connected with the flexible closure member for movement therewith with respect to the reactor core for controlling the amount of leakage of neutrons from the core, and the container having gas therein whereby as the temperature of the reactor varies the coolant liquid will expand and contract causing the pressure of the gas to respectively increase and decrease so that forces due to the pressure differential of the fluids interiorly and exteriorly of the container are exerted on the control member via the closure member to respectively move the control member away from and closer to the reactor core to thereby control neutron leakage and hence the temperature of the reactor.

6. In combination, a nuclear reactor thermoelectric power plant including a reactor core of nuclear fuel material submerged in water of relatively constant pressure, a first mechanically rigid container having an opening defined therein, a second mechanically rigid container having an opening defined therein and mounted within the first container so as to define a space therebetween with its opening adjacent to and in alignment with the opening in the first container, the reactor core having a plurality of coolant passages formed therethrough and mounted within the second container on the inner surface thereof, the second container being partially filled with reactor coolant liquid for circulation through the coolant passages in the reactor core to cool the core, porous thermal insulating means located in the space between the first and second containers for maintaining a temperature differential therebetween, a plurality of thermoelectric elements located in the space between first and second containers for generating electrical energy due to a temperature differential therebetween, and means, for controlling the temperature of the reactor comprising a flexible closure member hermetically sealed to the first container at the opening therein so as to close the opening, a neutron reflecting control member located within the second container and mechanically connected with the flexible closure member via the opening in the second container for movement therewith with respect to the reactor core for controlling the amount of leakage of neutrons from the core, the remaining space in the second container and the pores in the insulating means being filled with non-reactive gas with the gas communicating via the opening in the second container whereby as the temperature of the reactor core varies the coolant liquid will expand and contract causing the pressure of the gas within the containers to respectively increase and decrease so that forces due to the pressure differential of the water exteriorly of and the gas and the coolant liquid interiorly of the first container are exerted on the control member via the closure member to respectively move the control member away from and closer to the reactor core to thereby control neutron leakage and hence the temperature of the reactor.

7. The combination as claimed in claim 6, wherein the coolant liquid is sodium potassium and wherein a second flexible closure member is hermetically sealed to the first container outwardly of the first closure member so as to define a chamber therebetween with the chamber being filled with liquid mercury to insure separation of the water externally of the first container and the sodium potassium coolant.

8. The combination as claimed in claim 6, wherein the coolant liquid is sodium potassium and the gas in the containers is a gas selected from the group consisting of argon, nitrogen, helium and krypton.

References Cited by the Examiner

UNITED STATES PATENTS

| | | | |
|---|---|---|---|
| 2,951,943 | 9/1960 | Goodman | 176—22 X |
| 2,951,946 | 9/1960 | Frey et al. | 176—22 X |
| 3,052,616 | 9/1962 | Graham | 176—21 |
| 3,085,957 | 4/1963 | Natland | 176—33 X |
| 3,127,319 | 3/1964 | Natland | 176—39 X |

FOREIGN PATENTS

| | | |
|---|---|---|
| 1,211,272 | 10/1959 | France. |
| 1,123,415 | 2/1962 | Germany. |
| 890,572 | 3/1962 | Great Britain. |

OTHER REFERENCES

Nucleonics, August 1960, pp. 58–63.

REUBEN EPSTEIN, *Primary Examiner.*

CARL D. QUARFORTH, *Examiner.*